(12) United States Patent
Ichihara

(10) Patent No.: US 9,211,764 B2
(45) Date of Patent: Dec. 15, 2015

(54) PNEUMATIC TIRE

(71) Applicant: BRIDGESTONE CORPORATION, Chuo-ku, Tokyo (JP)

(72) Inventor: Eiji Ichihara, Sayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/480,003

(22) Filed: Sep. 8, 2014

(65) Prior Publication Data
US 2014/0373993 A1    Dec. 25, 2014

Related U.S. Application Data

(62) Division of application No. 13/511,938, filed as application No. PCT/JP2010/006924 on Nov. 26, 2010, now abandoned.

(30) Foreign Application Priority Data

Nov. 26, 2009   (JP) .................................. 2009-268494

(51) Int. Cl.
*B60C 9/20* (2006.01)
*B60C 9/22* (2006.01)
*B60C 9/00* (2006.01)

(52) U.S. Cl.
CPC .................. *B60C 9/20* (2013.01); *B60C 9/0007* (2013.04); *B60C 9/0042* (2013.04);
(Continued)

(58) Field of Classification Search
CPC ...... B60C 9/20; B60C 9/2006; B60C 9/0042; B60C 9/0007; B60C 9/2003; B60C 9/22; B60C 9/2204; B60C 2009/016; B60C 2009/2022; B60C 2009/2093; B60C 2009/0035; B60C 2009/0071; B60C 2009/0085; B60C 2009/2214; B60C 2009/2228; B60C 2009/228
USPC .......................... 152/535, 531, 533, 534, 526
See application file for complete search history.

(56) References Cited

U.S. PATENT DOCUMENTS 4,420,025 A    12/1983 Ghilardi et al.
5,746,853 A    5/1998 Burlacot
(Continued)

FOREIGN PATENT DOCUMENTS

JP    53-104907 A    9/1978
JP    03-104706 A    5/1991
(Continued)

OTHER PUBLICATIONS

Machine translation of JP2008-155730 (no date).*
(Continued)

*Primary Examiner* — Richard Crispino
*Assistant Examiner* — Philip N Schwartz
(74) *Attorney, Agent, or Firm* — Sughrue Mion, PLLC

(57) ABSTRACT

Provided is a pneumatic tire having excellent durability and driving stability during high-speed running of the vehicle (that is, during high-speed rotation of the tire). The pneumatic tire includes: a carcass; an intersecting belt which is provided on the outer circumference side of a crown portion of the carcass and formed of two inclined belt layers having cords inclined and extending in a direction intersecting each other across a tire equatorial plane; and a circumferential belt layer which is provided on either one of the inner side and the outer side of the intersecting belt in the tire radial direction and includes a spiral cord arranged as being spirally wound at an inclination angle of equal to or smaller than 5 degrees to the tire equatorial plane. Of the two inclined belt layers forming the intersecting belt, the cords in a first inclined belt layer are inclined at an inclination angle that falls within the range of 45 to 90 degrees relative to the tire equatorial plane, while the cords in a second inclined belt layer are inclined at an inclination angle that falls within the range of 15 to 45 degrees relative to the tire equatorial plane and is smaller than the inclination angle of the cords in the first inclined belt layer.

5 Claims, 2 Drawing Sheets

(52) U.S. Cl.
CPC ............ *B60C 9/2003* (2013.04); *B60C 9/2006* (2013.04); *B60C 9/2009* (2013.04); *B60C 9/2204* (2013.04); *B60C 2009/2016* (2013.04); *B60C 2009/2019* (2013.04); *B60C 2009/2022* (2013.04); *B60C 2009/2093* (2013.04); *Y10T 152/10801* (2015.01)

(56) References Cited

U.S. PATENT DOCUMENTS

| | | |
|---|---|---|
| 2009/0008017 A1 | 1/2009 | Kawai et al. |
| 2009/0095396 A1 | 4/2009 | Harikae |

FOREIGN PATENT DOCUMENTS

| | | | | |
|---|---|---|---|---|
| JP | 09-183302 | A | | 7/1997 |
| JP | 2004074826 | A | | 3/2004 |
| JP | 2006193032 | A | | 7/2006 |
| JP | 2008-155730 | A | | 7/2008 |
| JP | 2008155730 | A * | 7/2008 | ................ B60C 9/22 |
| JP | 2008-184002 | A | | 8/2008 |
| JP | 2009-073245 | A | | 4/2009 |
| JP | 2009073245 | A * | 4/2009 | ............. B60C 11/00 |
| JP | 2009-154685 | A | | 7/2009 |
| WO | 2006/129708 | A1 | | 12/2006 |

OTHER PUBLICATIONS

Machine translation of JP2009-073245 (no date).*
Japanese Notification, dated Aug. 13, 2013, issued in corresponding Japanese Patent Application No. 2011-543114.
Chinese Office Action, dated Jan. 6, 2014, issued in corresponding Chinese Patent Application No. 201080053290.6.
Chinese Office Action, dated Jul. 15, 2014, issued in corresponding Chinese Patent Application No. 201080053290.6.
International Search Report for PCT/JP2010/006924, dated Mar. 1, 2011.
Japanese Office Action, dated Aug. 5, 2014, issued in corresponding Japanese Patent Application No. 2011-543114.
Communication dated Jan. 19, 2015 from the State Intellectual Property Office of People's Republic of China in counterpart Application No. 201080053290.6.
Communication dated Feb. 13, 2015 from the European Patent Office in counterpart Application No. 10832867.5.
Communication dated Sep. 18, 2015 from the State Intellectual Property Office of the P.R.C. in counterpart application No. 201080053290.6.

* cited by examiner

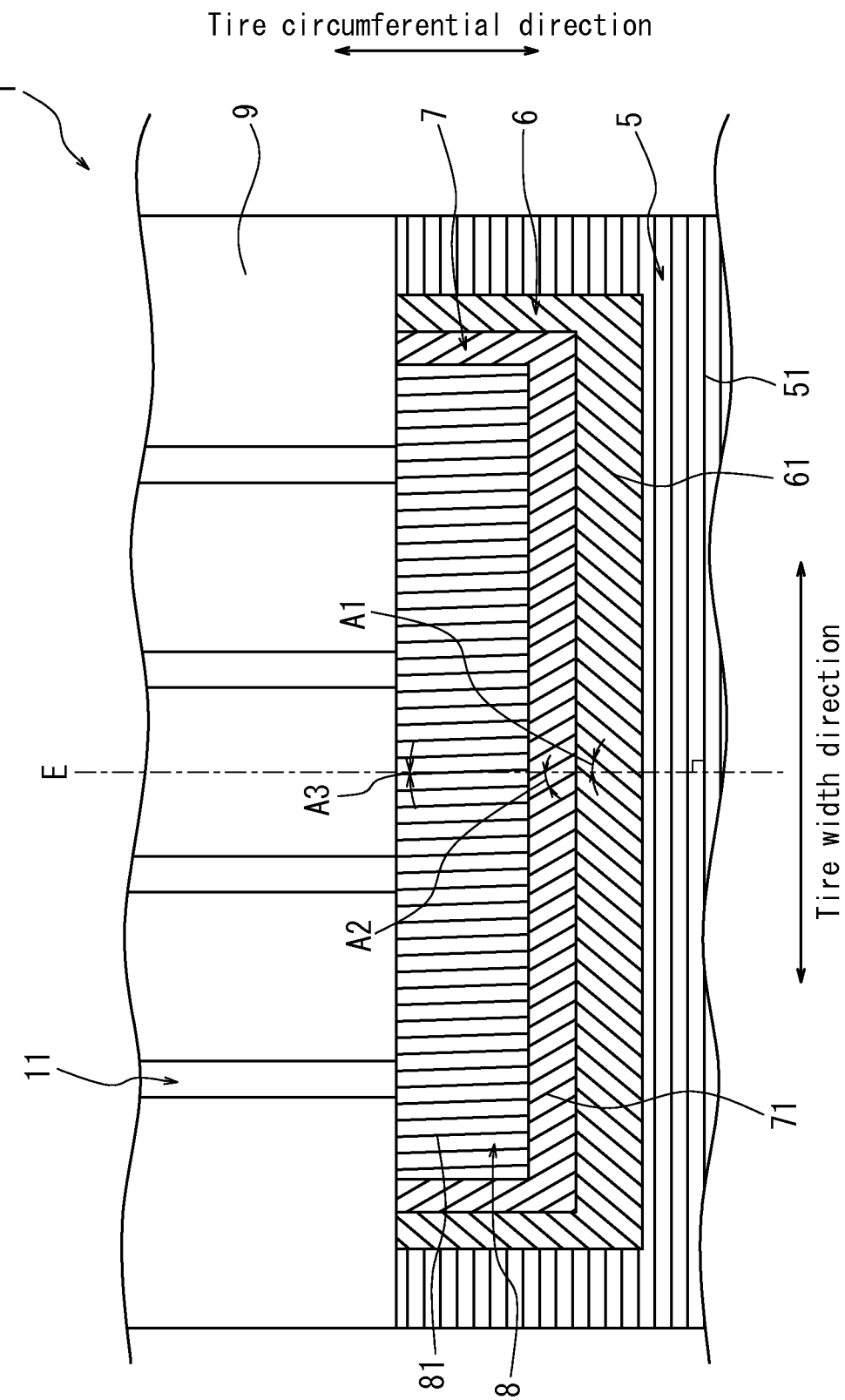

PNEUMATIC TIRE

CROSS REFERENCE TO RELATED APPLICATION

This application is a divisional of U.S. application Ser. No. 13/511,938, filed May 24, 2012, which is a National Stage of International Application No. PCT/JP2010/006924, filed on Nov. 26, 2010, which claims priority from Japanese Patent Application No. 2009-268494, filed on Nov. 26, 2009, the contents of all of which are incorporated herein by reference in their entirety.

TECHNICAL FIELD

The present invention relates to a pneumatic tire, in particular, a pneumatic tire excellent in durability and driveability during high-speed running of the vehicle (that is, during high-speed rotation of the tire).

RELATED ART

In recent years, along with the enhanced performance of vehicles, there are increasing occasions to run vehicles at high speed. Accordingly, pneumatic tires to be mounted on vehicles are also required to have further improved durability and driveability (steering stability) during high-speed running.

In view of this, there has been proposed a pneumatic tire including: two belt layers (an inside belt layer and an outside belt layer) which are arranged so that steel cords embedded in these layers intersect with each other; and a spiral belt layer provided with a circumferential cord (spiral cord) embedded therein, the circumferential cord being spirally wound substantially parallel to the tire circumferential direction, in which the steel cords embedded in the inside belt layer and in the outside belt layer are inclined at an angle of 45 to 80 degrees to the tire equatorial plane, to thereby prevent the occurrence of crack between an end portions of the belt layers and the spiral belt layer while improving driveability (see, for example, Patent Document 1).

However, in the above-mentioned conventional pneumatic tire in which the steel cords embedded in the inside belt layer and the steel cords embedded in the outside belt layer are both inclined at a high angle of 45 to 80 degrees relative to the tire equatorial plane, the inside and outside belt layers are easy to elongate in the tire circumferential direction. This configuration cannot sufficiently suppress the deformation (elongation) of the belt layers in the tire circumferential direction and outward expansion (diameter growth) of the tire in the tire radial direction resulting from the elongation. Accordingly, in the conventional pneumatic tire, when the inside belt layer, the outside belt layer, and the spiral belt layer are subjected to a large tensile force in the tire circumferential direction due to inflation pressure or centrifugal forces during high-speed running, it is necessary to suppress the diameter growth of the tire only by the spiral belt layer, which may result in degradation in durability of the tire. Further, when the circumferential cord of the spiral belt layer is ruptured as being penetrated by a foreign object or the like, the tread portion is greatly deformed due to tensile force in the tire circumferential direction, which may lead to the occurrence of cracks.

RELATED ART DOCUMENT

Patent Document

Patent Document 1: JP 2009-73245 A

DISCLOSURE OF THE INVENTION

Problems to be Solved by the Invention

In view of the above, there has been a demand for improving tire durability while reducing degradation in driveability, to thereby provide a pneumatic tire excellent in durability and driveability during high-speed running of the vehicle.

Means for Solving the Problem

The present invention has an object to advantageously solve the abovementioned problems. A pneumatic tire according to the present invention includes: a carcass formed of at least one ply that toroidally extends; an intersecting belt which is provided on the outer circumference side of a crown portion of the carcass and formed of two inclined belt layers having cords inclined and extending in a direction intersecting each other across a tire equatorial plane; and a circumferential belt layer which is provided on either one of the inner side and the outer side of the intersecting belt in the tire radial direction and includes a spiral cord arranged as being spirally wound at an inclination angle of equal to or smaller than 5 degrees to the tire equatorial plane, in which: of the two inclined belt layers forming the intersecting belt, the cords in a first inclined belt layer are inclined at an inclination angle that falls within the range of 45 to 90 degrees measured from the acute-angle side relative to the tire equatorial plane; and, of the two inclined belt layers forming the intersecting belt, the cords in a second inclined belt layer are inclined at an inclination angle that falls within the range of 15 to 45 degrees measured in a direction opposite to the inclination angle of the cords in the first inclined belt layer, relative to the tire equatorial plane, and is smaller, in absolute value, than the inclination angle of the cords in the first inclined belt layer. When the inclination angle (A2) of the cords of the second inclined belt layer is set to 15 to 45 degrees relative to the tire equatorial plane as described above, the second inclined belt layer can also serve, as well as the circumferential belt layer, to suppress the diameter growth of the tire, so as to improve the tire in durability, in particular, durability during high-speed running (high-speed durability). Further, even when the spiral cord of the circumferential belt layer is ruptured as being penetrated by a foreign object or the like, the diameter growth of the tire can still be prevented by means of the second inclined belt layer. In addition, when the inclination angle (A1) of the cords in the first inclined belt layer is set to 45 to 90 degrees relative to the tire equatorial plane and also defined as A1>A2, both of the inclined belt layers, namely, the first inclined belt layer and the second inclined belt layer are allowed to elongate in the tread width direction without difficulty, so that the tread portion can be prevented from being stiffened. As a result, the tire can be improved in durability without deteriorating driveability. Here, if A1 is defined as smaller than 45 degrees, the tread portion is stiffened, which decreases the contact area during running, leading to a deterioration in driveability. Meanwhile, if A2 is defined as larger than 45 degrees, the cords in the second inclined belt layer fail to sufficiently carry tensile force in the tire circumferential direction when the tire is subjected to tensile force in the tire circumferential direction, and hence the tire cannot be fully improved in durability, in particular, high-speed durability. In contrast, if A2 is defined as smaller than 15 degrees, the second inclined belt layer is susceptible to deformation when the tread portion is subjected to lateral force (force in the tire width direction) during cornering or the like, leading to a deterioration in driveability. It should be noted that, in the pneumatic tire according to the present invention, the first inclined belt layer may be provided on the outer side than the second inclined belt layer in the tire radial direction, or may be provided on the inner side than the second inclined belt layer in the tire radial direction.

Here, in the pneumatic tire according to the present invention, the second inclined belt layer and the circumferential belt layer may preferably be adjacent to each other in the tire radial direction. When the second inclined belt layer and the circumferential belt layer are adjacent to each other in the tire radial direction, the cords in the belt layers (that is, the spiral cord and the cords in the second inclined belt layer) form a smaller angle between the belt layers adjacent to each other in the tire radial direction. As a result, rubber deformation between the circumferential belt layer and the second inclined belt layer is kept small, which is less likely to increase rolling resistance.

Further, in the pneumatic tire according to the present invention, the cords in the first inclined belt layer and the cords in the second inclined belt layer may preferably be steel cords. Steel cords are high in rigidity, so as to sufficiently increase driveability.

Also, in the pneumatic tire according to the present invention, the spiral cord may preferably be a steel cord. With the use of a steel cord having high rigidity as the spiral cord, the elongation of the circumferential belt layer in the tire circumference direction can be suppressed to minimum, to thereby effectively prevent the diameter growth of the tire.

Further, in the pneumatic tire according to the present invention, the spiral cord may preferably be a cord made of aromatic polyamide, polyketone, polyethylene naphthalate, or polyethylene terephthalate. The reasons are as follows. A cord made of aromatic polyamide (such as, for example, Kevlar (trademark)), polyketone, polyethylene naphthalate, or polyethylene terephthalate, is relatively high in strength. Further, the cord is lightweight, which can reduce the weight of the tire so as to improve driveability.

Still further, in the pneumatic tire according to the present invention, the spiral cord may preferably have a rupture elongation of 3% or more and 8% or less. When the rupture elongation of the spiral cord is less than 3%, it becomes difficult to manufacture a pneumatic tire by a conventional manufacturing method. When the rupture elongation is larger than 8%, the spiral cord lacks rigidity, which may deteriorate driveability. It should be noted that, in the present invention, the term "rupture elongation" refers to a total elongation at break measured according to JIS G3510-1992.

Effect of the Invention

The present invention is capable of improving durability of a tire while reducing degradation in driveability, to thereby provide a pneumatic tire that is excellent in durability and driveability during high-speed running of the vehicle (that is, during high-speed rotation of the tire).

BRIEF DESCRIPTION OF THE DRAWINGS

FIG. 2 is an explanatory diagram illustrating an internal structure of a tread portion of the pneumatic tire of FIG. 1, the tread portion being fractured and removed in part.

BEST MODES FOR CARRYING OUT THE INVENTION

Figure 1:
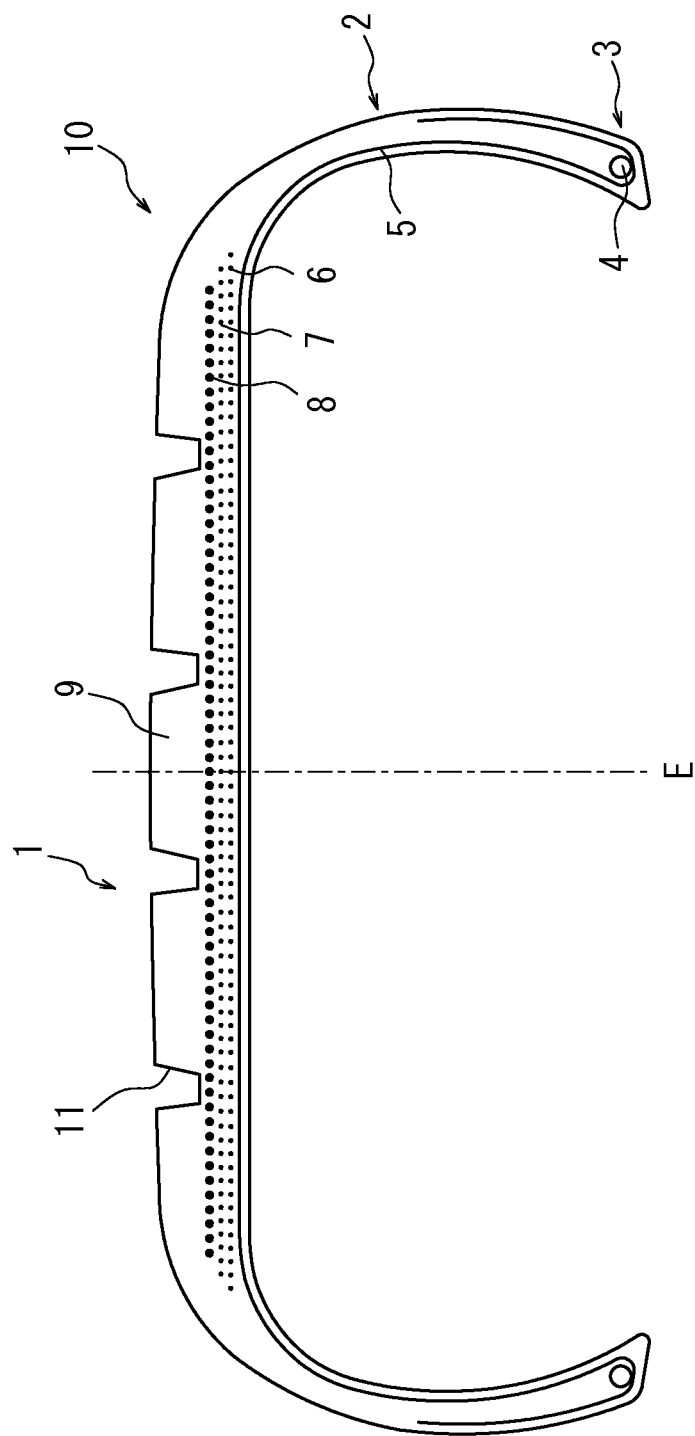
FIG. 1 is a sectional view showing an example of a pneumatic tire according to the present invention in the tire width direction.

In the following, embodiments of the present invention are described with reference to the drawings. A pneumatic tire 10 according to an example of the present invention includes, as illustrated in FIG. 1 in section in the width direction thereof, a tread portion 1, a pair of sidewall portions 2 each extending inward in the tire radial direction from a lateral part of the tread portion 1, and a pair of bead portions 3 each continuing inward in the tire radial direction from each of the sidewall portions 2.

Further, the pneumatic tire 10 includes a carcass 5 formed of one ply extending between the pair of bead portions 3. The carcass 5 toroidally extends from the tread portion 1 across each of the pair of bead portions 3 via each of the pair of sidewall portions 2, and is folded back so as to be locked around each bead core 4 embedded in each of the pair of bead portions 3. Although the carcass 5 of FIG. 1 is formed of one ply, the carcass may include two or more plies as necessary in the pneumatic tire of the present invention.

Further, as illustrated in FIG. 1, the tread portion 1 of the pneumatic tire 10 includes, on the outer circumference side of a crown portion of the carcass 5, a first inclined belt layer 6, a second inclined belt layer 7, a circumferential belt layer 8, and a tread rubber 9, which are arranged in order from inward to outward in the tire radial direction. Further, the tread portion 1 has a plurality of grooves 11 formed therein, which form a tread pattern.

Here, as illustrated in FIG. 2, which shows an internal structure of the tread portion 1 with the tread portion 1 being fractured and removed in part, the carcass 5 has cords 51 embedded therein. The cords 51 are formed of twisted organic fibers, and arranged parallel to one another so as to be at 90 degrees relative to the tire equatorial plane E. Also, the first inclined belt layer 6 has first cords 61 embedded therein, the first cords 61 being arranged parallel to one another and inclined at an inclination angle A1 relative to the tire equatorial plane E. Further, the second inclined belt layer 7 has second cords 71 embedded therein, the second cords 71 being arranged parallel to one another and inclined in a direction opposite to the first cords 61 (in a left-upward direction in FIG. 2) at an inclination angle A2 relative to the tire equatorial plane E. Then, the first cords 61 and the second cords 71 intersect one another across the tire equatorial plane E, so that the first inclined belt layer 6 and the second inclined belt layer 7 form an intersecting belt. Further, the circumferential belt layer 8 has a spiral cord 81 embedded therein, the spiral cord 81 being spirally wound at an inclination angle A3 which is larger than 0 degrees and equal to or smaller than 5 degrees relative to the tire equatorial plane E.

Steel cords formed of twisted steel single wires may be employed as the first cords 61 in the first inclined belt layer 6, for example. The inclination angle A1 of the first cords 61 relative to the tire equatorial plane E may be set to 45 to 90 degrees. When the inclination angle A1 is set to 45 degrees or larger, the tread portion 1 can be formed with stiffness that is appropriate enough to ensure the contact area of the tread portion 1 during running, which can reduce degradation in driveability, as compared to a case where the inclination angles A1 and A2 are both reduced to small. In view of increasing the difference between the inclination angle A1 and the inclination angle A2 so as to more reliably reduce degradation in driveability, it is particularly preferred to set the inclination angle A1 to 45 to 70 degrees.

Similarly to the first cords 61, the steel cords may be employed as the second cords 71 in the second inclined belt layer 7, for example. The inclination angle A2 of the second cords 71 relative to the tire equatorial plane E may be set to 15 to 45 degrees and to an angle smaller than the inclination angle A1 (A1>A2). When the inclination angle A2 is set to 15 degrees or larger, the second inclined belt layer 7 can be made unsusceptible to deformation even when the tread portion 1 is subjected to force in the tire width direction during cornering, which is less likely to cause degradation in driveability. When the inclination angle A2 is set to 45 degrees or less, the second inclined belt layer 7 is less likely to be elongated in the tire circumferential direction, so that the second inclined belt layer 7 can also serve, as well as the circumferential belt layer 8, to suppress the diameter growth of the pneumatic tire 10, with the result that the pneumatic tire 10 can be sufficiently improved in durability, in particular, durability during high-speed running (high-speed durability).

In addition to the steel cords, organic fiber cords formed of twisted organic fibers made of aromatic polyamide, polyketone, polyethylene naphthalate, or polyethylene terephthalate may be employed as the spiral cord 81 of the circumferential belt layer 8, for example. When there is a need to keep to a minimum the elongation of the circumferential belt layer in the tire circumferential direction so as to effectively suppress the diameter growth of the tire, it is preferred to employ, as the spiral cord 81, a steel cord that is high in rigidity, and more preferred to employ a steel cord having a rupture elongation of 3 to 8%. When the rupture elongation is smaller than 3%, the circumferential belt layer 8 hardly elongates, which makes it difficult to manufacture the pneumatic tire 10 by a conventional manufacturing method. When the rupture elongation is larger than 8%, the spiral cord lacks rigidity, which may deteriorate driveability. On the other hand, when there is a need to reduce the weight of the tire so as to improve driveability, it is preferred to employ, as the spiral cord 81, an organic fiber cord that is lightweight and high in strength, and more preferred to employ an organic fiber cord having a rupture elongation of 3 to 8%.

The spiral cord 81 is embedded in the circumferential belt layer 8 as being spirally wound so as to be arranged at the inclination angle A3 (larger than 0 degrees and equal to or smaller than 5 degrees), which is substantially parallel to the tire equatorial plane E. Here, the inclination angle A3 may be set to, for example, 0.1 to 0.4 degrees.

Then, according to the pneumatic tire 10, the diameter growth of the tire can be prevented even when the first inclined belt layer 6, the second inclined belt layer 7, and the circumferential belt layer 8 are subjected to a large tensile force in the tire circumferential direction due to inflation pressure or centrifugal forces during high-speed running, because the second inclined belt layer 7 and the circumferential belt layer 8 carry the tensile force. Accordingly, the tire can be increased in durability. Further, in the pneumatic tire 10, the first inclined belt layer 6 is easy to elongate in the tire circumferential direction, and hence the tread portion 1 can be formed with stiffness appropriate enough to ensure the contact area of the tread portion 1 during running, to thereby provide excellent driveability. In addition, even when the spiral cord 81 of the circumferential belt layer 8 is ruptured as being penetrated by a foreign object or the like, the diameter growth of the tire can still be prevented by means of the second inclined belt layer 7. Further, the second inclined belt layer 7 and the circumferential belt layer 8 are adjacent to each other in the tire radial direction, so that the cords in the belt layers form a smaller angle (A2-A3) between the belt layers adjacent to each other in the tire radial direction. As a result, rubber deformation between the circumferential belt layer 8 and the second inclined belt layer 7 is kept small, which is less likely to increase rolling resistance.

It should be noted that the pneumatic tire according to the present invention is not limited to one example described above, and may be subjected to alterations as appropriate.

Specifically, the circumferential belt layer may be provided on the inner side than the first inclined belt layer and the second inclined belt layer in the tire radial direction. This configuration prevents the spiral cord in the circumferential belt layer from being ruptured as being penetrated by a foreign object or the like. Further, the first inclined belt layer may be provided on the outer side than the second inclined belt layer in the tire radial direction. With this configuration, the cords in the belt layers adjacent to each other in the tire radial direction form a larger angle, which enhances rigidity in the tire width direction, to thereby increase driveability during cornering.

EXAMPLES

In the following, the present invention is described in further detail with reference to Examples. However, the present invention is in no way limited to the examples described below.

Example 1

There was manufactured a pneumatic tire as a sample having a configuration illustrated in FIG. 1 with the dimensions shown in Table 1, except that the carcass includes two plies. The tire was in size 225/45R17, and had the carcass plies formed of twisted cords of polyethylene organic fibers. The twisted cords were arranged at 90 degrees relative to the tire equatorial plane. Then, the tire was subjected to performance evaluation according to the following methods. The results thereof are shown in Table 1.

Examples 2 to 5

There were manufactured pneumatic tires as samples, similarly to Example 1, except that the inclination angle A2 of the second cords was changed as shown in Table 1. Then, each tire was subjected to performance evaluation similarly to Example 1. The results thereof are shown in Table 1.

Examples 6 to 10

There were manufactured pneumatic tires as samples, similarly to Example 1, except that the inclination angle A2 of the second cords was set to 30 degrees and the spiral cord was changed in rupture elongation. Then, each tire was subjected to performance evaluation similarly to Example 1. The results thereof are shown in Table 1.

Examples 11, 12

There were manufactured pneumatic tires as samples, similarly to Example 1, except that the inclination angle A2 of the second cords was set to 30 degrees and the spiral cord was changed in type. Then, each tire was subjected to performance evaluation similarly to Example 1. The results thereof are shown in Table 1.

Examples 13 to 17

There were manufactured pneumatic tires as samples, similarly to Example 1, except that the inclination angle A2 of the second cords was set to 30 degrees and the inclination angle A1 of the first cords was changed as shown in Table 1. Then, each tire was subjected to performance evaluation similarly to Example 1. The results thereof are shown in Table 1.

Conventional Example 1

There was manufactured a pneumatic tire as a sample according to JP 2009-73245 A, with the dimensions shown in Table 1 and in size of 225/45R17. Then, the tire was subjected to performance evaluation similarly to Example 1. The results thereof are shown in Table 1.

Comparative Examples 1 to 3

There were manufactured pneumatic tires as samples similarly to Example 1, except that the inclination angle A2 of the second cords was changed as shown in Table 1. Then, each tire was subjected to performance evaluation similarly to Example 1. The results thereof are shown in Table 1.

High-Speed Durability

The sample tires were each mounted on a rim in standard size (of 7.5 J) based on JATMA standards and filled with an internal pressure of 300 kPa. Then, the tire was pressed against a drum under a load of 4.82 kN, so as to evaluate high-speed durability. Specifically, the tire was started to run at a speed of 150 km/h, which was increased by 10 km/h per 10 minutes, so as to run the tire until tire failure occurred. Then, the running distance to the tire failure was obtained, and the distance was subjected to index evaluation with a score of 100 representing the running distance to tire failure obtained for the tire of Conventional Example 1. When the value is higher, the tire is higher in durability and hence more excellent in performance.

<Dry Driveability>

A test tire was mounted on a domestic FR car (rim: 7.5 J×17) of 2,500 cc displacement, and filled with an internal pressure of 230 kPa. Then, a skilled test driver drove the car on a test course by changing lanes at 150 km/h, limit turning at 80 km/h, and accelerating from 50 km/h, so as to make evaluation on a scale of one to ten. With a score of 7.0 and above, the tire is excellent in driveability as compared to conventional tires in the market. On the other hand, with a score of 5.5 and below, the tire is rated as low in driveability even though it may provide the required performance in the market.

<Incidence of External Defects>

Out of 20 sample tires, the number of tires that had suffered external defects was counted. Then, the number thus counted was divided by the total number of the sample tires, to thereby obtain the incidence of external defects.

<Tire Weight>

The sample tires were each measured for weight, and subjected to index evaluation with a score of 100 representing the tire weight of Conventional Example 1. When the value is smaller, the weight is smaller and hence the tire is light-weight.

Table 1 shows that the pneumatic tires of Examples 1 to 17 are capable of reducing degradation in driveability while improving durability of the tires, as compared to the pneumatic tires of Conventional Example 1 and Comparative Examples 1 to 3. Also, the pneumatic tires of Examples 7 to 9 are capable of attaining high driveability without causing external defects. Further, the pneumatic tires of Examples 11 and 12 are capable of attaining weight reduction in the tires. Further, the pneumatic tires of Example 3 and Examples 13 to 15 are capable of attaining high driveability, as compared to the pneumatic tires of Examples 16 and 17.

INDUSTRIAL APPLICABILITY

The present invention is capable of improving tire durability while reducing degradation in driveability, to thereby provide a pneumatic tire excellent in durability and driveability during high-speed running of the vehicle (that is, during high-speed rotation of the tire).

DESCRIPTION OF NUMERALS 1 tread portion
2 sidewall portion
3 Bead portion
4 bead core
5 carcass
6 first inclined belt layer
7 second inclined belt layer
8 circumferential belt layer
9 tread rubber
10 pneumatic tire
11 groove
51 cord
61 first cord
71 second cord
81 spiral cord

TABLE 1

| | First Cord Inclination Angle (degrees) | Second Cord Inclination Angle (degrees) | Spiral Cord Type | Rupture Elongation (%) | Durability | Dry Driveability | Incidence of External Defects (%) | Tire Weight |
|---|---|---|---|---|---|---|---|---|
| Conventional Example 1 | 60 | 60 | Steel | 5 | 100 | 6.5 | 0 | 100 |
| Comparative Example 1 | 60 | 55 | Steel | 5 | 101 | 6.5 | 0 | 100 |
| Comparative Example 2 | 60 | 50 | Steel | 5 | 103 | 6.5 | 0 | 100 |
| Comparative Example 3 | 60 | 10 | Steel | 5 | 131 | 5.5 | 0 | 100 |
| Example 1 | 60 | 45 | Steel | 5 | 110 | 6.5 | 0 | 100 |
| Example 2 | 60 | 40 | steel | 5 | 117 | 6.5 | 0 | 100 |
| Example 3 | 60 | 30 | steel | 5 | 124 | 7 | 0 | 100 |
| Example 4 | 60 | 20 | steel | 5 | 129 | 7 | 0 | 100 |
| Example 5 | 60 | 15 | steel | 5 | 130 | 7 | 0 | 100 |
| Example 6 | 60 | 30 | steel | 2 | 122 | 7 | 20 | 100 |
| Example 7 | 60 | 30 | steel | 3 | 123 | 7 | 0 | 100 |
| Example 8 | 60 | 30 | steel | 7 | 125 | 6.5 | 0 | 100 |
| Example 9 | 60 | 30 | steel | 8 | 125 | 6.5 | 0 | 100 |
| Example 10 | 60 | 30 | steel | 9 | 126 | 5.5 | 0 | 100 |
| Example 11 | 60 | 30 | Kevlar | — | 120 | 7 | 0 | 94 |
| Example 12 | 60 | 30 | PET | — | 110 | 6.5 | 0 | 95 |
| Example 13 | 45 | 30 | steel | 5 | 124 | 7.5 | 0 | 100 |
| Example 14 | 50 | 30 | steel | 5 | 124 | 7.5 | 0 | 100 |
| Example 15 | 70 | 30 | steel | 5 | 124 | 7 | 0 | 100 |
| Example 16 | 80 | 30 | steel | 5 | 124 | 6.5 | 0 | 100 |
| Example 17 | 90 | 30 | steel | 5 | 124 | 6.5 | 0 | 100 |

The invention claimed is:

1. A pneumatic tire, comprising:
a carcass formed of at least one ply that toroidally extends;
an intersecting belt which is provided on the outer circumference side of a crown portion of the carcass and formed of two inclined belt layers having cords inclined and extending in a direction intersecting each other across a tire equatorial plane; and
a circumferential belt layer which is provided on the outer side of the intersecting belt in the tire radial direction and includes a spiral cord arranged as being spirally wound at an inclination angle of equal to or smaller than 5 degrees to the tire equatorial plane,
wherein, of the two inclined belt layers forming the intersecting belt, the cords in a first inclined belt layer are inclined at an inclination angle that falls within the range of 45 to 90 degrees measured from the acute-angle side relative to the tire equatorial plane;
wherein, of the two inclined belt layers forming the intersecting belt, the cords in a second inclined belt layer are inclined at an inclination angle that falls within the range of 15 to 30 degrees measured in a direction opposite to the inclination angle of the cords in the first inclined belt layer, relative to the tire equatorial plane, and is smaller, in absolute value, than the inclination angle of the cords in the first inclined belt layer,
wherein the spiral cord has a rupture elongation of 3% or more and 8% or less,
wherein the first inclined belt layer and the circumferential belt layer are adjacent to each other in the tire radial direction,
wherein the second inclined belt layer, the first inclined belt layer, and the circumferential belt layer are arranged in order from inward to outward in the tire radial direction, and
wherein only one first inclined belt layer, one second inclined belt layer, and one circumferential belt layer are provided as belt layers having cords on the outer circumference side of the crown portion of the carcass.

2. The pneumatic tire according to claim 1, wherein the cords in the first inclined belt layer and the cords in the second inclined belt layer are steel cords.

3. The pneumatic tire according to claim 1, wherein the spiral cord is a steel cord.

4. The pneumatic tire according to claim 1, wherein the spiral cord is a cord made of aromatic polyamide, polyketone, polyethylene naphthalate, or polyethylene terephthalate.

5. The pneumatic tire according to claim 1, wherein a width of the circumferential belt layer in the width direction is less than both a width of the first inclined belt layer in the width direction and a width of the second inclined belt layer in the width direction.

* * * * *